(No Model.)  2 Sheets—Sheet 1.
M. NEIL.
APPLIANCE FOR PLASHING HEDGES.
No. 550,640. Patented Dec. 3, 1895.
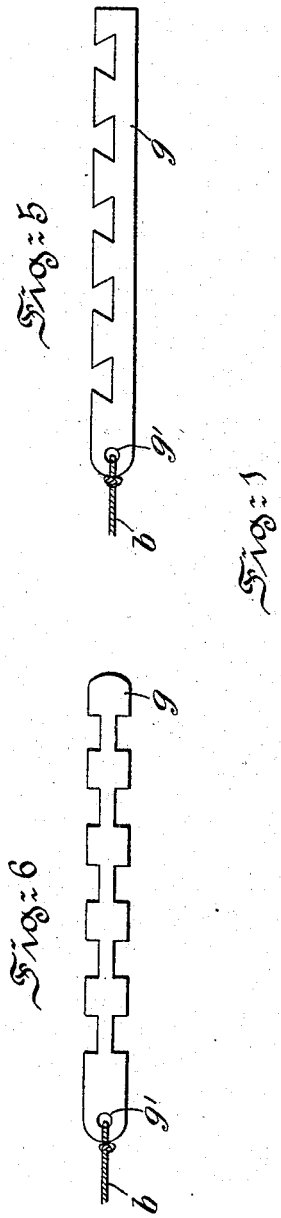
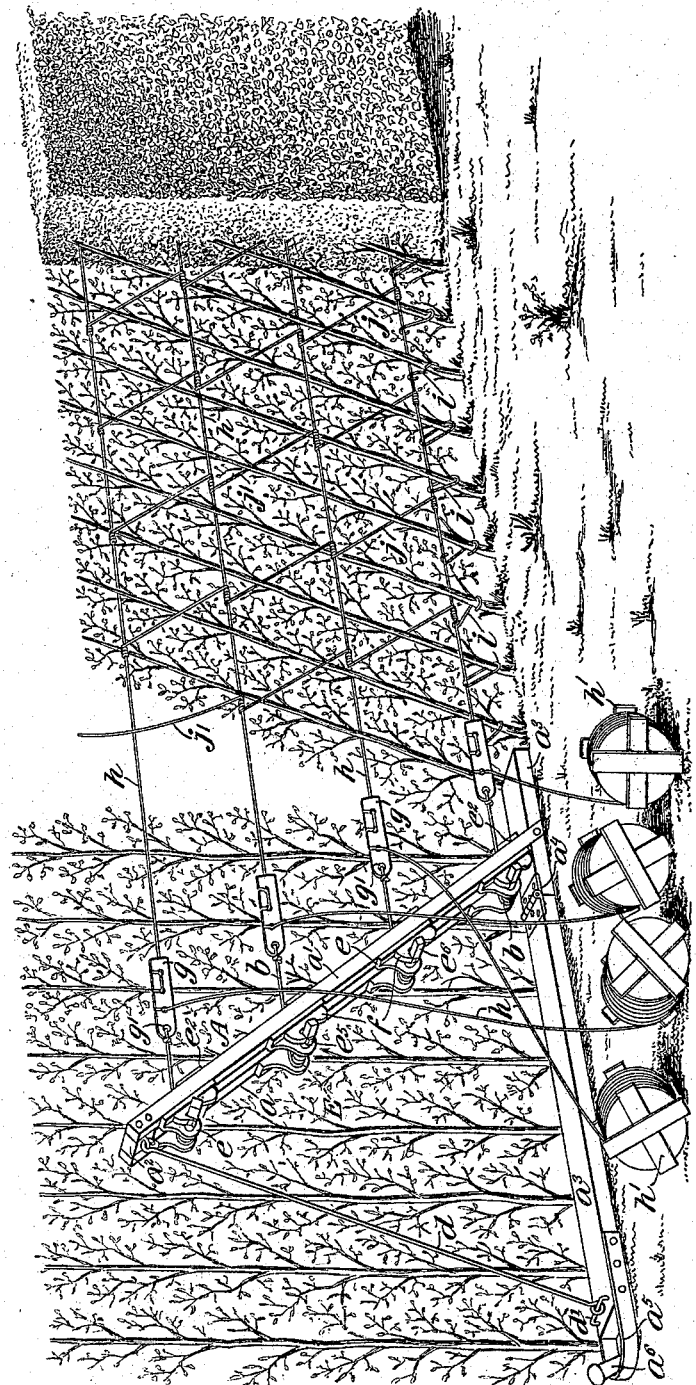
Witnesses:
Thomas M. Smith.
Richard C. Maxwell.
Inventor.
Michael Neil,
By J. Walter Douglass.
Attorney.

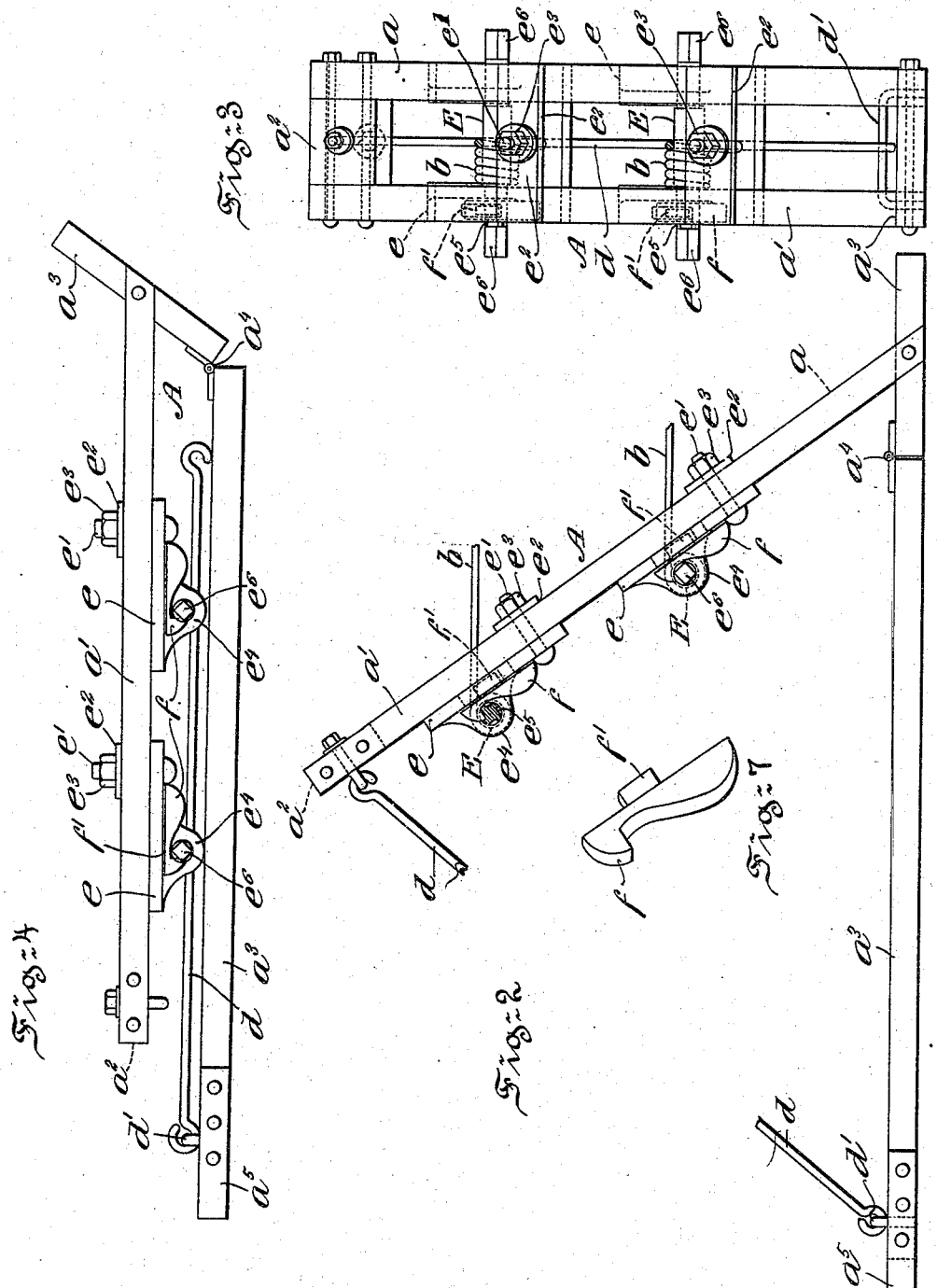

UNITED STATES PATENT OFFICE.

MICHAEL NEIL, OF DAYTON, OHIO.

APPLIANCE FOR PLASHING HEDGES.

SPECIFICATION forming part of Letters Patent No. 550,640, dated December 3, 1895.

Application filed February 25, 1895. Serial No. 539,560. (No model.)

*To all whom it may concern:*

Be it known that I, MICHAEL NEIL, a citizen of the United States, residing at Dayton, in the county of Montgomery and State of Ohio, have invented certain new and useful Improvements in Appliances for Plashing Hedges, of which the following is a specification.

My invention relates in general to that class of hedge fences in which the plants or canes are bent downward in the direction of the plane of the fence, and it relates particularly to appliances for plashing such live hedge fences.

The principal object of my invention is to provide simple, durable, and effective means for plashing plants to constitute a live hedge fence without the employment of means calculated to sap, stunt, or cause decay of the shoots or twigs of the plants or canes in their inclined or bent position.

My invention comprises a series of longitudinal wires stretched along either side of a growing hedge by means of a series of cables connected with a frame provided with operating appliances constructed and arranged in substantially the manner hereinafter described and claimed.

The nature and scope of my present invention will be more fully understood from the following description, taken in connection with the accompanying drawings, forming part hereof, in which—

Figure 1 is a perspective view showing the natural growth of a live hedge fence and also such a hedge plashed by means of an appliance embodying the features of my invention. Fig. 2 is a side elevational view, on an enlarged scale, of the appliance of my invention, showing the detail construction and arrangement of the same for plashing a live hedge fence. Fig. 3 is a front view of the same. Fig. 4 is a view showing the parts of the appliance in a folded position for convenience in carriage. Figs. 5 and 6 are respectively side elevational views of two forms of a wire-holder forming part of my invention; and Fig. 7 is a perspective view of the gravity-pawl, showing the arrangement thereof detached from the slotted frame of the appliance.

Referring to the drawings, A is a standard consisting of two strips $a$ and $a'$, of wood or other suitable material. Each of these strips is about one inch thick by four inches wide, more or less.

$a^2$ are blocks located between and fastened to the strips $a$ and $a'$ in such manner as to leave an oblong opening, through which cables $b$ are operated in tightening or stretching wires $h$ in a manner to be presently fully explained. These strips combined form the standard A, the lower end of which is fastened to a bed-piece $a^3$, extending about one foot, more or less, in advance of the inclined standard A and any required distance in rear thereof. The standard A inclines rearwardly at an angle and from the top of the same, and detachably connected therewith is a rod $d$, extending rearwardly and engaging a clip $d'$, secured into the rear end of the bed piece or sill $a^3$. The bed piece or sill $a^3$ is made preferably in two parts, hinged to each other at $a^4$, as illustrated in Figs. 1 and 2, in order that by detaching one end of the rod $d$ the device of my invention may be folded for convenience in handling or moving about from place to place. At the rear end of the bed piece or sill $a^3$ a suitable opening or loop $a^5$ is provided, through which a stake $a^6$ may be driven into the ground to prevent the frame from being displaced in use. The rearwardly-slanting position of the standard A is intended to overcome in part any tendency to tip forward while in use, as the draft or pull of the cables will tend to slide the bed piece or sill along on the ground instead of tipping it forward, and this sliding is prevented by the stake or pin $a^6$, driven into the ground through the opening or loop $a^5$ at the rear end of the bed piece or sill $a^3$, as hereinbefore fully explained.

$e$ is an adjustable frame engaging one side of the strips $a$ and $a'$ of the inclined standard A by means of a threaded bar or bolt $e'$, provided with a clamping-plate $e^2$ and nut $e^3$, or in any other preferred manner, whereby the said frame may be raised and lowered in connection with the inclined standard A. This frame is provided with slotted bearers $e^4$ for a drum or cylinder E, provided with a ratchet $e^5$ and with square ends $e^6$ on one or both ends, as clearly illustrated in Fig. 2. In Figs. 1 and 2 of the drawings a series of such drums or cylinders E are shown in connection with the standard A.

$f$ is a gravity-pawl loosely fitting an oblong slot in one member of the adjustable frame $e$ and held therein and free to fall by means of a rear lug $f'$, secured to or formed integral with the pawl, so as to engage the ratchet of each drum or cylinder E in order to prevent unwinding of the cable $b$ from each drum or cylinder. The cable is wound thereon by means of a wrench or other similar tool applied to either square end of the same.

It may be here remarked that other means may be employed to maintain the gravity-pawl in required position, such as a lug cast or fastened to one member of the adjustable frame $e$ at the upper part thereof, so as to limit the extent of movement of said pawl, or it may be arranged in any other preferred manner, as will be understood from the drawings, and perform its functions as hereinbefore explained—that is, engage the ratchet of the drum or cylinder to prevent unwinding of the cable $b$ therefrom.

$g$ in Fig. 5 is one form of a toothed wire-holder, having one end provided with an opening $g'$ for engaging the cable $b$. A wire $h$ may be passed in and out alternately between the teeth of the same from a reel $h'$, or other device for carrying the wire, as clearly illustrated in Fig. 1 of the drawings. In Fig. 5 the teeth are arranged on but one side of the holder $g$, while in Fig. 6 they are disposed on both sides, so as to permit of an intertwisting of the wires with said teeth, so as to hold taut the line-wires during the plashing of the plants and thus to insure greater uniformity of position of these wires with respect to each other in the plashed hedge.

By rotating the drums or cylinders E the cables $b$ are wound thereon and the longitudinal or line wires $h$ are drawn taut and the bottom wire is anchored to required position by hooks or clips $i$, engaging therewith and the plants or canes, as illustrated in Fig. 1 of the drawings. The canes or stems of the hedge are now bent down at angle in sequence in a line with the plane of the fence, including such of the branches or twigs as may be desired, and they are secured in that position by cross wires or stays $j$ and $j'$, which are wrapped around the lower longitudinal or line wire and then caused to embrace the branches of the canes as well as the plants, and the wires or stays then are intertwisted or wound around the next line-wire, and so on are they caused to embrace other canes or branches thereof till the top longitudinal line-wire is reached, to which the said wires are secured, thereby forming, as it were, a network of wire and hedge.

By the above operation, carried out as above explained, plashing of the hedge is completed and the hedge may then be trimmed to any form, shape, or height required.

Having thus described the nature and objects of my invention, what I claim as new, and desire to secure by Letters Patent, is—

1. The combination with an inclined standard provided with a folding bed-piece, a connecting rod therefor, a cable engaging a drum provided with a ratcheted end, said drum connected with an adjustable frame engaging said standard, and a pawl provided with a lug adapted to slide in a way so as to movably engage the ratcheted end of said drum, of a toothed wire holder connected with said cable and with a wire to maintain the latter taut during drawing, and means for actuating said drum, substantially as and for the purposes described.

2. The combination, with an inclined standard provided with a folding bed-piece and a detachable connecting rod, an adjustable frame connected with said standard and provided with a drum having a ratcheted end and a gravity pawl provided with a lug engaging a way of said adjustable frame, of a cable engaging said drum and a toothed wire holder connected with said cable and with a wire, substantially as and for the purposes described.

In testimony whereof I have hereunto set my signature in the presence of two subscribing witnesses.

MICHAEL NEIL.

Witnesses:
A. H. STOCKTON,
CLYDE RUTH.